US007008011B2

(12) United States Patent
Gevay

(10) Patent No.: US 7,008,011 B2
(45) Date of Patent: Mar. 7, 2006

(54) EMERGENCY ROOF DETACHMENT DEVICE FOR A VEHICLE

(76) Inventor: Frank M. Gevay, 1000 Caballo Blvd., Henderson, NV (US) 89014

( * ) Notice: Subject to any disclaimer, the term of this patent is extended or adjusted under 35 U.S.C. 154(b) by 45 days.

(21) Appl. No.: 10/761,867

(22) Filed: Jan. 21, 2004

(65) Prior Publication Data

US 2005/0115151 A1 Jun. 2, 2005

Related U.S. Application Data

(63) Continuation-in-part of application No. 10/271,693, filed on Oct. 17, 2002, now abandoned.

(51) Int. Cl.
*B60J 7/11* (2006.01)

(52) U.S. Cl. .................... 296/218; 49/141; 292/DIG. 5

(58) Field of Classification Search ................ 296/218, 296/103; 49/141; 292/DIG. 5
See application file for complete search history.

(56) References Cited

U.S. PATENT DOCUMENTS

| | | | | | |
|---|---|---|---|---|---|
| 2,022,718 | A | * | 12/1935 | Heins | 292/38 |
| 2,389,315 | A | * | 11/1945 | Kerr | 292/21 |
| 4,220,368 | A | * | 9/1980 | Ferrigan | 296/215 |
| 4,548,434 | A | * | 10/1985 | Princell | 292/223 |
| 5,738,405 | A | * | 4/1998 | Richters et al. | 296/193.03 |
| 2005/0073179 | A1 | * | 4/2005 | Williams | 296/218 |

* cited by examiner

*Primary Examiner*—Dennis H. Pedder
(74) *Attorney, Agent, or Firm*—Craig Weiss; Harry M. Weiss; Weiss, Moy & Harris, P.C.

(57) ABSTRACT

An emergency roof detachment device for a vehicle providing a detachable roof portion that is coupled to a fixed top portion of a vehicle and has a handle capable of allowing the occupants of the vehicle to detach the detachable roof portion of a vehicle in order to facilitate an escape from the vehicle in an emergency situation.

7 Claims, 2 Drawing Sheets

EMERGENCY ROOF DETACHMENT DEVICE FOR A VEHICLE

CROSS-REFERENCE TO RELATED APPLICATIONS

This is a continuation-in-part of U.S. patent application Ser. No. 10/271,693 filed Oct. 17, 2002 now abandoned in the name of the Applicant, to which priority is claimed.

FIELD OF THE INVENTION

This invention relates generally to safety devices for vehicles and, more specifically, to an emergency roof detachment device for a vehicle dimensioned to allow a driver or another person to detach substantially the entire roof portion of the vehicle from the body of the vehicle in the event that the vehicle's occupants are trapped and unable to use other means, such as the vehicle's doors, to escape a disabled vehicle.

BACKGROUND OF THE INVENTION

Over 40,000 people die every year in road accidents in the United States. Many victims of car crashes are not killed instantly but rather succumb to their wounds at a later time. Often, the delay in receiving life-saving medical care is a contributing cause to the death. Occasionally, medical personnel arrive on the scene to treat the victims of car accidents, but are unable to reach the victims because they are trapped in a badly damaged vehicle. In side-impact collisions especially, the side doors of a vehicle are often crushed, rendering them unusable.

It is often the case that in order to dispense life-saving medical treatment, the occupants of a vehicle must first be extricated from the damaged vehicle. In the event that the doors of the vehicle have been disabled, or the vehicle is on its side, blocking the doors closest to the vehicle's occupants, another way must be found to remove the victims of a car crash.

Currently, emergency medical personnel must wait precious amounts of time for fire department or other rescue services to arrive with hydraulic tools, such as cutters, spreaders, rams, "Jaws of Life" and the like, in order to cut the vehicle open. These piston-rod hydraulic tools as well as other tools often require electricity, are heavy, and very expensive. The result is that it is time-consuming and often impossible to employ such devices, and the result is that lives are lost.

Much of the time, cutting tools are used to cut open the roof of a vehicle, since this is often the largest and easiest area of a vehicle to get to. The roof of a vehicle, when removed, also provides the easiest access to the vehicle's occupants.

Occasionally, after an accident, a person is not badly injured, but is nevertheless unable to extricate himself or herself through the damaged doors of a vehicle. This predicament often results in death when the car catches on fire, and the trapped occupant either suffocates or is burned to death.

Several attempts have been made to solve this problem with various kinds of vehicle hatches. All such inventions provide relatively small hatches, however, allowing only room enough for a single person to exit the vehicle at any one time. Additionally, depending on the type of accident, the placement of the relatively small escape hatch may prevent passengers trapped in the backseat of the vehicle from utilizing the hatch in order to exit the vehicle.

For example, U.S. Pat. No. 4,495,731 issued to Sears shows an outwardly opening hatch that is hinged to the roof of a vehicle. This design poses several problems. Due to the relatively small size of the hatch, in the event that more than one person is in the vehicle, the delay caused by waiting for others to exit the hatch may result in death or serious injury, especially in the event that the vehicle catches on fire. Additionally, the hinges prevent detachment of the hatch, leaving the hatch in the area of the roof, which can often be an obstacle to removing a person from a vehicle. European Patent Application 89201170.1 also shows a relatively small, hinged escape hatch for a vehicle. Japanese Patent 4-212626 shows an escape hatch that is not hinged, but suffers from the same size limitations of the other prior art. In all of the prior art references, if the relatively small hatch area of the roof is damaged, which can occur in a rollover accident, it is possible that the hatch may be unusable.

A need therefore existed for an emergency roof detachment device for a vehicle having a detachable roof portion that comprises substantially the entire roof of a vehicle and is therefore capable of providing all of the occupants of a vehicle with the ability to easily escape from a disabled vehicle by initiating detachment of the detachable roof portion of a vehicle.

SUMMARY OF THE INVENTION

An object of the present invention is to provide an emergency roof detachment device for a vehicle capable of detaching a detachable roof portion of a vehicle in order to facilitate the exit of one or more occupants from the vehicle.

It is a further object of the present invention to provide a method for exiting a vehicle capable of allowing one or more persons the ability to detach a detachable roof portion of a vehicle in order to exit the vehicle.

BRIEF DESCRIPTION OF THE PREFERRED EMBODIMENTS

In accordance with one embodiment of the present invention, an emergency roof detachment device for a vehicle is disclosed, comprising, in combination, a vehicle having a fixed top portion, the fixed top portion defining an opening, a crossbar having a first end and a second end, the first end of the crossbar being coupled to a passenger side of the fixed top portion of the vehicle, the second end of the crossbar being coupled to a driver side of the fixed top portion of the vehicle so that the crossbar reinforces the fixed top portion of the vehicle, the crossbar being dimensioned to bisect the opening into a front opening proximate a front windshield of the vehicle and a rear opening proximate a rear windshield of the vehicle, each the front opening and the rear opening being dimensioned to permit a person to pass therethrough, a detachable roof portion having a front end and a back end and dimensioned to be detachably coupled to the fixed top portion of the vehicle, the front end of the detachable roof portion being detachably coupled to the fixed top portion of the vehicle proximate a top portion of a front windshield and the back end of the detachable roof portion being detachably coupled to the fixed top portion of the vehicle proximate a top portion of a rear windshield, and a handle coupled to an interior portion of the vehicle and dimensioned to initiate detachment of the detachable roof portion from the fixed top portion of the vehicle.

In accordance with another embodiment of the present invention, a method for exiting a vehicle is disclosed comprising, in combination, the steps of providing a vehicle having a fixed top portion, the fixed top portion defining an opening, providing a crossbar having a first end and a second end, the first end of the crossbar being coupled to a passenger side of the fixed top portion of the vehicle, the second end of the crossbar being coupled to a driver side of the fixed top portion of the vehicle so that the crossbar reinforces the fixed top portion of the vehicle, the crossbar being dimensioned to bisect the opening into a front opening proximate a front windshield of the vehicle and a rear opening proximate a rear windshield of the vehicle, each the front opening and the rear opening being dimensioned to permit a person to pass therethrough, providing a detachable roof portion having a front end and a back end and dimensioned to be detachably coupled to the fixed top portion of the vehicle, the front end of the detachable roof portion being detachably coupled to the fixed top portion of the vehicle proximate a top portion of a front windshield and the back end of the detachable roof portion being detachably coupled to the fixed top portion of the vehicle proximate a top portion of a rear windshield, providing a handle coupled to an interior portion of the vehicle and dimensioned to initiate detachment of the detachable roof portion from the fixed top portion of the vehicle, and initiating detachment of the detachable roof portion from the fixed top portion.

The foregoing and other objects, features, and advantages of the invention will be apparent from the following, more particular description of the preferred embodiments of the invention, as illustrated in the accompanying drawings.

DETAILED DESCRIPTION OF THE PREFERRED EMBODIMENTS

Figure 1:
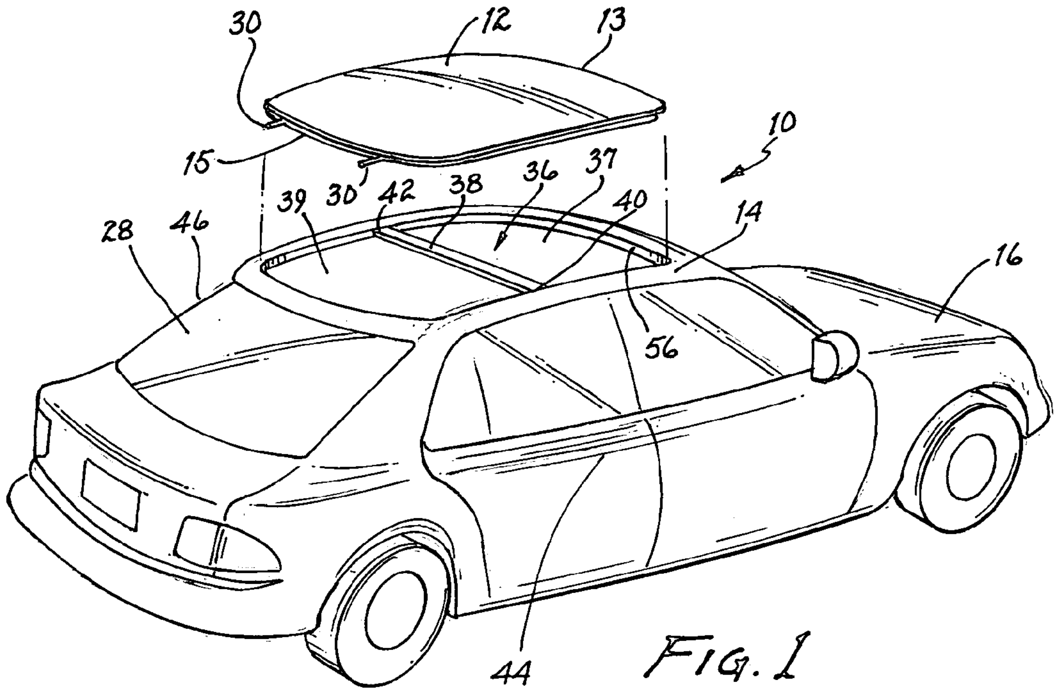
FIG. 1 is a perspective view of the preferred embodiment of the emergency roof detachment device for a vehicle of the present invention.
Figure 2:
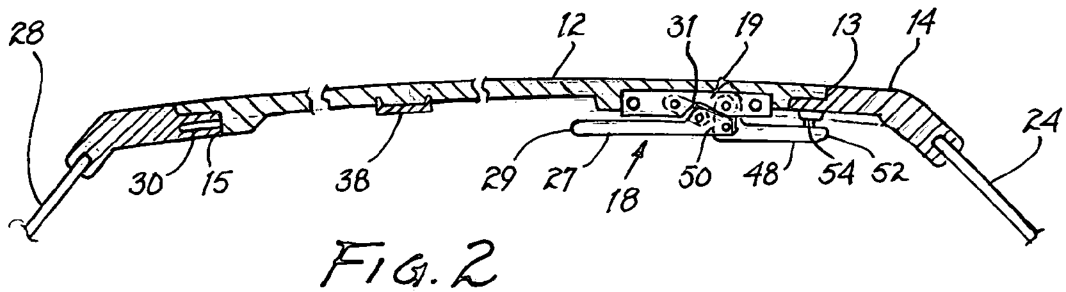
FIG. 2 is a side, cross-sectional view of the emergency roof detachment device of FIG. 1.
Figure 3:
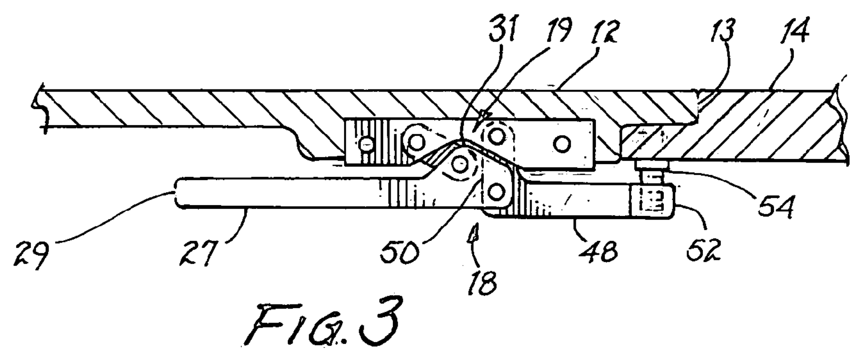
FIG. 3 is a side, cross-sectional view of the handle of the emergency roof detachment device of the present invention used to initiate detachment of the detachable roof portion from the fixed top portion of the vehicle.
Figure 4:
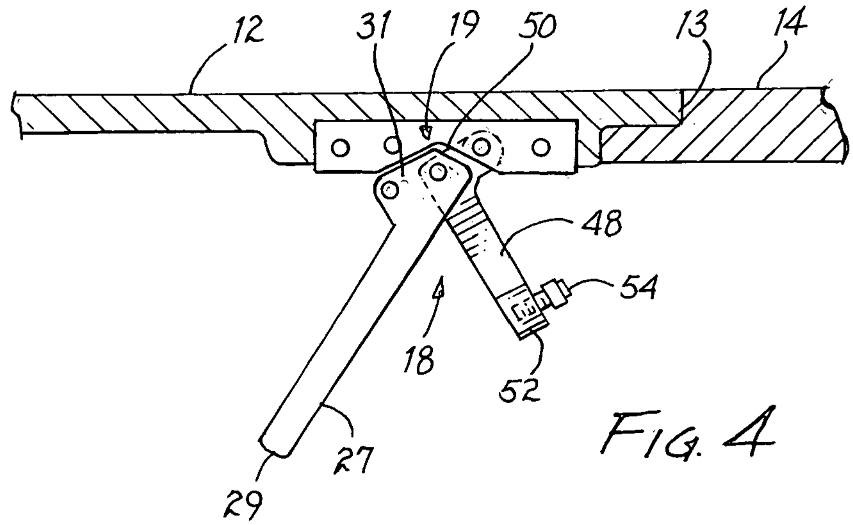
FIG. 4 is a side, cross-sectional view of the handle of FIG. 3, showing the handle in the unlocked position after initiating detachment of the detachable roof portion.
Figure 5:
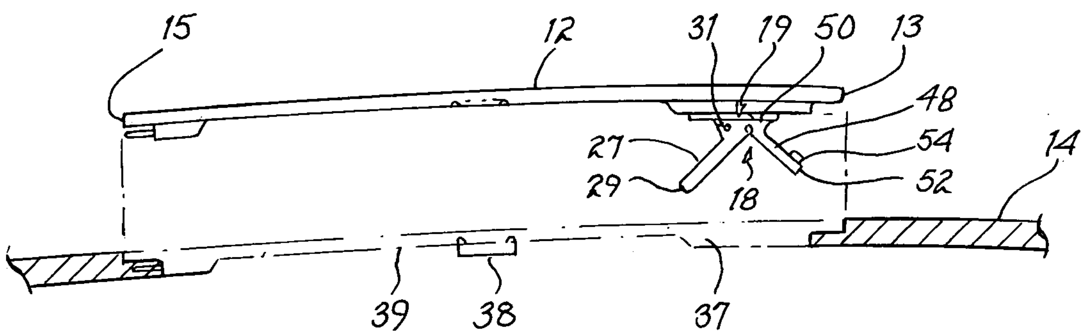
FIG. 5 is a side view of the detachable roof portion being detached from the fixed roof portion of the vehicle after the handle initiated detachment of the detachable roof portion.
Figure 6:
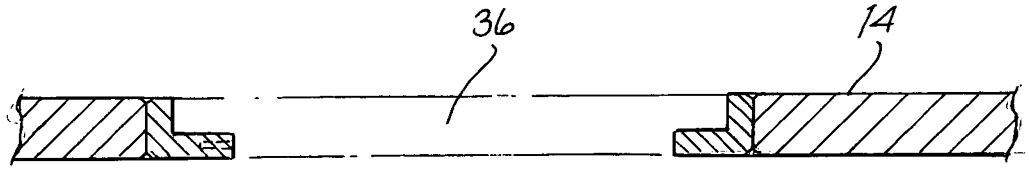
FIG. 6 is a side, cross sectional view of the fixed roof portion of a vehicle defining an opening dimensioned to be covered by the detachable roof portion of the present invention.

Referring to FIG. 1, reference number 10 refers generally to the preferred embodiment of the emergency roof detachment device for a vehicle of the present invention. The emergency roof detachment device 10 comprises a vehicle 16 having a fixed top portion 14 that defines an opening 36. The emergency roof detachment device 10 further comprises a crossbar 38 having a first end 40 and a second end 42. The first end 40 is coupled to a passenger side 44 of the fixed top portion 14 of the vehicle 16. The second end 42 is coupled to a driver side 46 of the fixed top portion 14 of the vehicle 16. The crossbar 38 is dimensioned to reinforce the fixed top portion 14 of the vehicle 16. The crossbar 38 may be made out of any material so long as that material is sufficiently strong as to add additional reinforcement to the fixed top portion 14 of the vehicle in the event of a rollover or other accident that may hinder or prevent the use of the emergency roof detachment device 10. The crossbar 38 is dimensioned to bisect the opening 36 into a front opening 37 proximate a front windshield 24 (shown in FIG. 2) of the vehicle 16 and a rear opening 39 proximate a rear windshield 28 of the vehicle 16. Both the front opening 39 and the rear opening 39 are dimensioned to permit a person to pass therethrough.

The emergency roof detachment device 10 further comprises a detachable roof portion 12 having a front end 13 and a back end 15 and is dimensioned to be detachably coupled to the fixed top portion 14 of the vehicle 16. The front end 13 of the detachable roof portion 12 is detachably coupled to the fixed top portion 14 of the vehicle 16 proximate a top portion of the front windshield 24. The back end 15 of the detachable roof portion 12 is detachably coupled to the fixed top portion 14 of the vehicle 16 proximate a top portion of a rear windshield 28.

In the preferred embodiment, the detachable roof portion 12 comprises substantially the entire roof of a vehicle 16, however, it should be clearly understood that substantial benefit could be derived from an alternative embodiment of the emergency roof detachment device 10 in which the detachable roof portion 12 does not comprise substantially the entire roof of a vehicle 16, such as in a long, strip-like configuration, so long as at least a portion of the front end 13 of the detachable roof portion 12 is coupled to the fixed top portion 14 of the vehicle 16 proximate a top portion of the front windshield 24 and at least a portion of the back end 15 of the detachable roof portion 12 is coupled to the fixed top portion 14 proximate a top portion of the rear windshield 28.

In the preferred embodiment, the detachable roof portion 12 is rectangular-shaped, although it should be clearly understood that substantial benefit could be derived from an alternative configuration of the emergency roof detachment device 10 in which the detachable roof portion 12 had a different shape, so long as at least a portion of the front end 13 of the detachable roof portion 12 is coupled to the fixed top portion 14 of the vehicle 16 proximate a top portion of the front windshield 24 and at least a portion of the back end 15 of the detachable roof portion 12 is coupled to the fixed top portion 14 proximate a top portion of the rear windshield 28. There are many ways to couple and configure the detachable roof portion 12 to a vehicle 16 so long as the detachable roof portion 12 uncovers at least one opening 36 large enough to permit a person to pass therethrough.

Preferably, the detachable roof portion 12 comprises a plurality of prong members 30, preferably protruding out of the back end 15 of the detachable roof portion 12, dimensioned to mate with corresponding recessed portions 32 (shown in FIG. 2) in the fixed top portion 14, preferably proximate the rear windshield 28, of the vehicle 16. While, in the preferred embodiment, a plurality of prongs 30 and corresponding recessed portions 28 are used to couple the detachable roof portion 12 to the fixed top portion 14, it should be clearly understood that substantial benefit could be derived from an alternative embodiment of the emergency roof detachment device 10 in which the detachable roof portion 12 is coupled to the fixed top portion 14 in a different way, so long as the detachable roof portion 12 can be easily detached from the fixed top portion 14 by a person.

Referring now to FIGS. 2–5, the emergency roof detachment device 10 further comprises a handle 18. The handle 18 is coupled to an interior portion of the vehicle 16 and dimensioned to initiate detachment of the detachable roof portion 12 from the fixed top portion 14 of the vehicle 16.

In the preferred embodiment, the handle 18 comprises a quick-release mechanism 19. The quick-release mechanism 19 allows the handle 18 to easily, and quickly initiate detachment of the detachable roof portion 12 from the fixed top portion 14. While, in the preferred embodiment, the handle 18 comprises a quick-release mechanism 19, it should be clearly understood that substantial benefit could be derived from an alternative embodiment of the emergency roof detachment device 10 which lacks a quick-release mechanism 19, so long as the handle 18 can be used to initiate detachment of the detachable roof portion 12 from the fixed top portion 14.

Still referring to FIGS. 2–5, the handle 18 preferably comprises a gripping arm 27 having a first end 29 and a second end 31. The first end 29 of the gripping arm 27 is dimensioned to be gripped by a person (not shown) and the second end 31 of the gripping arm 27 is pivotally coupled to the detachable roof portion 12. The handle 18 preferably further comprises a locking arm 48 having a first end 50 and a second end 52. The first end 50 of the locking arm 48 is pivotally coupled to both the second end 31 of the gripping arm 27 and the detachable roof portion 12. The second end 52 of the locking arm 48 is dimensioned to couple the locking arm 48 to the fixed roof portion 14 when the locking arm 48 is in a locked position. In the preferred embodiment, the emergency roof detachment device 10 further comprises a pad 54 coupled proximate the second end 52 of the locking arm 48. The pad 54 is dimensioned to cushion the locking arm 48 from the fixed roof portion 14 of the vehicle 16 when the locking arm 48 is in a locked position. While, in the preferred embodiment, the handle 18 comprises a gripping arm 27, a locking arm 48 and a pad 54, it should be clearly understood that substantial benefit could be derived from an alternative embodiment of the handle 18 that lacks some or all of the above-described features, so long as the handle 18 is capable of initiating detachment of the detachable roof portion 12 from the fixed top portion 14 of the vehicle 16.

Referring now to FIG. 1, the emergency roof detachment device 10 preferably comprises a reinforcing frame 56 coupled about the fixed roof portion 14 proximate the opening 36. The reinforcing frame 56 is dimensioned to reinforce the fixed roof portion 14 of the vehicle 16. The reinforcing frame 56 may or may not be used in conjunction with the crossbar 38 so long as it is capable of reinforcing the fixed roof portion 14. While, in the preferred embodiment, the emergency roof detachment device 10 comprises a reinforcing frame 56, it should be clearly understood that substantial benefit could be derived from an alternative embodiment of the present invention in which there is no reinforcing frame 56 or some other mechanism is used to reinforce the fixed roof portion 14 of the vehicle 16.

Statement of Operation

In order to operate the emergency roof detachment device 10, a vehicle 16 must be fitted with a detachable roof portion 12 that can be detachably coupled to a fixed top portion 14 of a vehicle 16 proximate an opening 36 dimensioned to permit a person to pass therethrough. The front end 13 of the detachable roof portion 12 is detachably coupled to the fixed top portion 14 of the vehicle proximate a top portion of the front windshield 24 and the back end 15 of the detachable roof portion 12 is detachably coupled to the fixed top portion 14 of the vehicle proximate a top portion of the rear windshield 28. This step may be done at a manufacturing stage. Once the detachable roof portion 12 is installed and the handle 18 is coupled to an interior portion of the vehicle 16, then one must simply use the handle, preferably by pulling, to initiate detachment of the detachable roof portion 12 from the fixed top portion 14 of the vehicle 16. The person using the handle 18 to initiate detachment of the detachable roof portion 12 of the emergency roof detachment device 10 may be either one of the occupants of the vehicle 16 or some other person reaching into the vehicle 16 in order to facilitate the exit of the occupant from the vehicle 16.

While the invention has been particularly shown and described with reference to preferred embodiments thereof, it will be understood by those skilled in the art that the foregoing and other changes in form and details may be made therein without departing from the spirit and scope of the invention.

I claim:

1. An emergency roof detachment device for a vehicle comprising, in combination:

- a vehicle having a fixed top portion, said fixed top portion defining an opening;
- a crossbar having a first end and a second end, said first end of said crossbar being coupled to a passenger side of said fixed top portion of said vehicle, said second end of said crossbar being coupled to a driver side of said fixed top portion of said vehicle so that said crossbar reinforces said fixed top portion of said vehicle, said crossbar being dimensioned to bisect said opening into a front opening proximate a front windshield of said vehicle and a rear opening proximate a rear windshield of said vehicle, each said front opening and said rear opening being dimensioned to permit a person to pass therethrough;
- a detachable roof portion having a front end and a back end and dimensioned to be detachably coupled to said fixed top portion of said vehicle, said front end of said detachable roof portion being detachably coupled to said fixed top portion of said vehicle proximate a top portion of a front windshield and said back end of said detachable roof portion being detachably coupled to said fixed top portion of said vehicle proximate a top portion of a rear windshield;
- a plurality of prong members coupled to a back end of said detachable roof portion and dimensioned to mate with corresponding longitudinal recessed portions defined by said fixed top portion of said vehicle proximate said rear windshield when said detachable roof portion covers said opening; and
- a handle having a quick-release mechanism and coupled to an interior portion of said vehicle proximate a front end of said detachable roof portion and dimensioned to initiate detachment of said detachable roof portion from said fixed top portion of said vehicle, wherein said handle comprising:
  - a gripping arm having a first end and a second end, said first end of said gripping arm dimensioned to be gripped by a person, said second end of said gripping arm being pivotally coupled to said detachable roof portion; and
  - a locking arm having a first end and a second end, said first end of said locking arm being pivotally coupled to both said second end of said gripping arm and said detachable roof portion, said second end of said locking arm dimensioned to couple said locking arm to said fixed roof portion when said locking arm being in a locked position.

2. The emergency roof detachment device of claim 1 wherein said detachable roof portion being substantially rectangular-shaped.

3. The emergency roof detachment device of claim 1 further comprising a pad coupled proximate said second end of said locking arm and dimensioned to cushion said locking arm from said fixed roof portion when said locking arm being in a locked position.

4. The emergency roof detachment device of claim 1 further comprising a reinforcing frame coupled about said fixed roof portion proximate said opening and dimensioned to reinforce said fixed roof portion.

5. A method for exiting a vehicle comprising, in combination, the steps of:

providing a vehicle having a fixed top portion, said fixed top portion defining an opening;

providing a crossbar having a first end and a second end, said first end of said crossbar being coupled to a passenger side of said fixed top portion of said vehicle, said second end of said crossbar being coupled to a driver side of said fixed top portion of said vehicle so that said crossbar reinforces said fixed top portion of said vehicle, said crossbar being dimensioned to bisect said opening into a front opening proximate a front windshield of said vehicle and a rear opening proximate a rear windshield of said vehicle, each said front opening and said rear opening being dimensioned to permit a person to pass therethrough; providing a detachable roof portion having a front end and a back end and dimensioned to be detachably coupled to said fixed top portion of said vehicle, said front end of said detachable roof portion being detachably coupled to said fixed top portion of said vehicle proximate a top portion of a front windshield and said back end of said detachable roof portion being detachably coupled to said fixed top portion of said vehicle proximate a top portion of a rear windshield;

providing a plurality of prong members coupled to a back end of said detachable roof portion and dimensioned to mate with corresponding longitudinal recessed portions defined by said fixed top portion of said vehicle proximate said rear windshield when said detachable roof portion covers said opening;

providing a handle having a quick-release mechanism and coupled to an interior portion of said vehicle proximate a front end of said detachable roof portion and dimensioned to initiate detachment of said detachable roof portion from said fixed top portion of said vehicle, wherein said handle comprising:

a gripping arm having a first end and a second end, said first end of said gripping arm dimensioned to be gripped by a person, said second end of said gripping arm being pivotally coupled to said detachable roof portion; and a locking arm having a first end and a second end, said first end of said locking arm being pivotally coupled to both said second end of said gripping arm and said detachable roof portion, said second end of said locking arm dimensioned to couple said locking arm to said fixed roof portion when said locking arm being in a locked position;

pulling said gripping arm in a downward direction to uncouple said detachable roof portion from said fixed top portion;

pushing said detachable roof portion away from said fixed top portion of said vehicle to uncover said opening; and exiting said interior portion of said vehicle through said opening defined by said fixed top portion of said vehicle.

6. The method of claim 5 further comprising the step of providing a pad coupled proximate said second end of said locking arm and dimensioned to cushion said locking arm from said fixed roof portion when said locking arm being in a locked position.

7. The method of claim 5 further comprising the step of providing a reinforcing frame coupled about said fixed roof portion proximate said opening and dimensioned to reinforce said fixed roof portion.

* * * * *